United States Patent
Buer (10) Patent No.: US 7,940,934 B2
(45) Date of Patent: May 10, 2011

(54) SYSTEM AND METHOD FOR SECURING COMPUTING MANAGEMENT FUNCTIONS

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1113 days.

(21) Appl. No.: 11/524,515

(22) Filed: Sep. 21, 2006

(65) Prior Publication Data

US 2007/0174616 A1    Jul. 26, 2007

Related U.S. Application Data (60) Provisional application No. 60/718,999, filed on Sep. 21, 2005.

(51) Int. Cl.
*H04L 29/00* (2006.01)
(52) U.S. Cl. .......................................... 380/277; 713/169
(58) Field of Classification Search .......... 713/168–170; 380/277; 726/2, 4, 6, 17
See application file for complete search history.

(56) References Cited

U.S. PATENT DOCUMENTS

| | | | |
|---|---|---|---|
| 2001/0044841 A1* | 11/2001 | Kosugi et al. | 709/223 |
| 2005/0289347 A1* | 12/2005 | Ovadia | 713/171 |
| 2006/0107032 A1 | 5/2006 | Paaske et al. | |
| 2006/0143475 A1* | 6/2006 | Herbert et al. | 713/191 |
| 2006/0156398 A1* | 7/2006 | Ross et al. | 726/22 |
| 2007/0061523 A1* | 3/2007 | Fuetsch et al. | 711/154 |
| 2007/0130472 A1 | 6/2007 | Buer et al. | |
| 2007/0168048 A1 | 7/2007 | Allen et al. | |

* cited by examiner

*Primary Examiner* — Vivek Srivastava
*Assistant Examiner* — Anthony Brown
(74) *Attorney, Agent, or Firm* — Sterne, Kessler, Goldstein & Fox P.L.L.C.

(57) ABSTRACT

In a computing management system authentication procedures are secured by protecting keys and/or processes used during the authentication procedures. In some embodiments the system cryptographically protects any keys used to mutually authenticate a management console and client. In some embodiments the system cryptographically protects execution of one or more of the algorithms used to mutually authenticate a management console and client.

20 Claims, 6 Drawing Sheets

SYSTEM AND METHOD FOR SECURING COMPUTING MANAGEMENT FUNCTIONS

CROSS REFERENCE TO RELATED APPLICATIONS

This application claims the benefit of U.S. Provisional Application No. 60/718,999, filed Sep. 21, 2005, the disclosure of which is incorporated by reference herein.

TECHNICAL FIELD

This application relates to data communications and, more specifically, to a system and method for securing computing management functions.

BACKGROUND OF THE INVENTION

Field of the Invention

To reduce the total cost of ownership of computing systems such as personal computers, various system administration tools have been developed to provide more cost effective system maintenance and to reduce the amount of time the systems are out of service. In general, these tools give IT administrators visibility and control over remote systems. For example, through a management console an administrator can power a remote system on and off and initiate the execution of maintenance routines on the remote system. In addition, a remote system may be configured to monitor various parameters relating to the proper operation of the system and report status and error information back to the management console.

Tools also have been developed that provide remote visibility or access to systems that have serious hardware or software problems that prevent the operating system from loading or working correctly and that provide remote management of systems operating in a low power mode. For example, the Distributed Management Task Force ("DMTF") developed an open remote control and alerting standard called the Alert Standard Format ("ASF").

ASF is a specification that defines methods for alerting and remote system control. ASF is specifically targeted at OS-absent environments. As used herein, the term "OS-absent" refers to a computer system that is in a state including, for example, a no active OS state, an inoperable OS state, a low-power state, and/or a system-sleep state.

The remote control and alerting system defined by ASF includes a management console that communicates with one or more clients. Here, the term "client" refers to a managed computing system. Typically, the management console is located remotely from the computing systems and communicates with the clients via a network. An alert sending device ("ASD"), which is a component in each client, interfaces with other components in the computing system to respond to remote control requests from the management console. Here, the management console may send a request to, for example, power-up, power-down, re-boot, or perform maintenance. The ASD also interfaces with sensors in the client computing system. When a sensor detects an "alert event," the ASD in the client sends a corresponding alerting message to the management console. To this end, the ASF specification defines interfaces for sensors, alert sending devices (which may include, for example, network interface cards or modems), management console software, and system firmware.

Tools such as ASF enable remote system access and control in both OS-present and OS-absent environments. These tools are primarily focused on minimizing on-site maintenance, maximizing system availability and performance to the local user, maximizing remote visibility of (and access to) local systems by network administrators, and minimizing the system power consumption required while maintaining the remote connection.

BRIEF DESCRIPTION OF THE DRAWINGS

These and other features, aspects and advantages of the invention will be more fully understood when considered with respect to the following detailed description, appended claims and accompanying drawings, wherein:

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Figure 1:
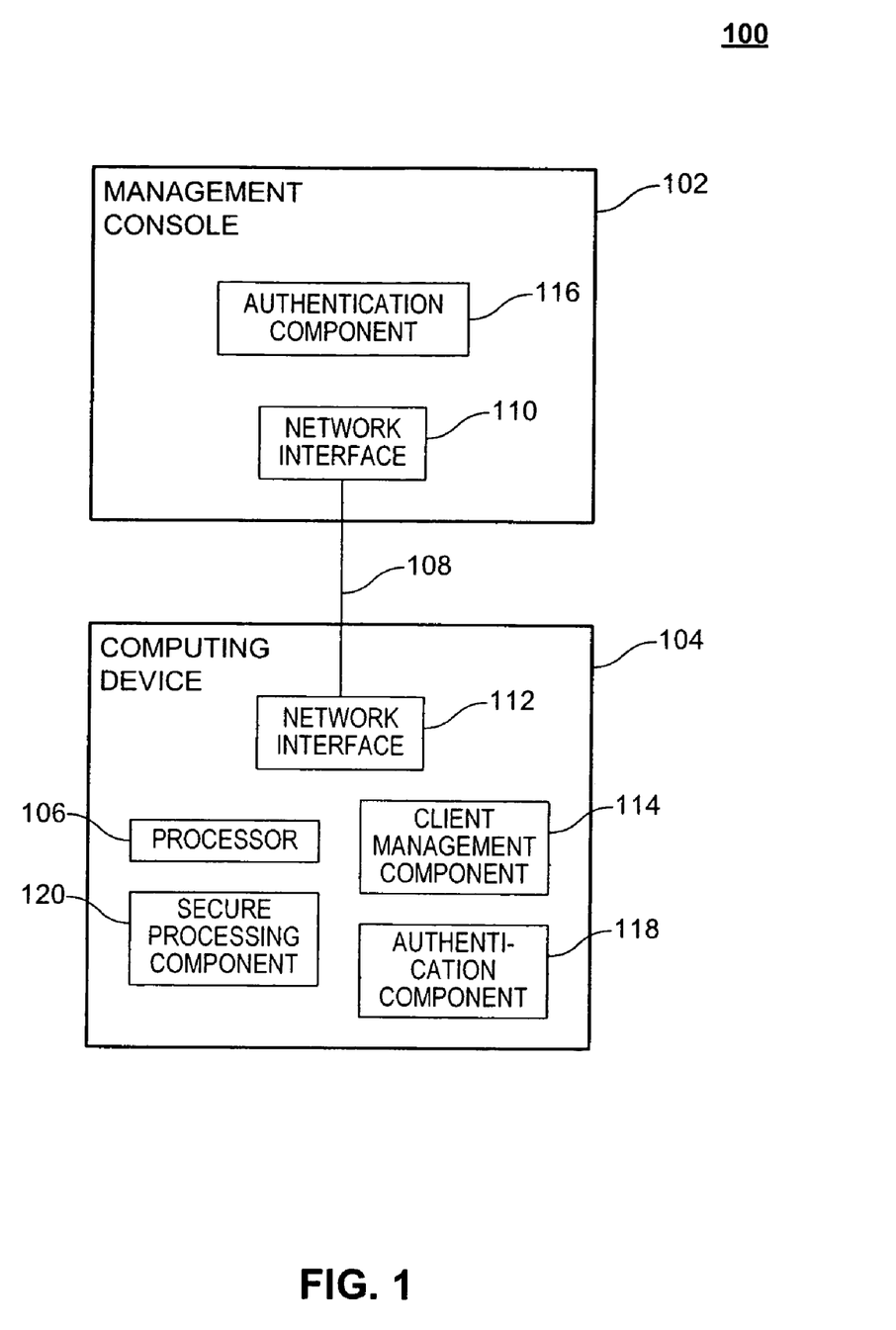
FIG. 1 is a block diagram of one embodiment of an ASF system implemented in accordance with the invention.

FIG. 1 illustrates one embodiment of a computing management system 100 including a management console 102 and one or more remote computing devices (hereafter referred to as "computing device 104"). Typically, the management console 102 includes a computer that is installed at a maintenance facility or some other location.

The management console 102 may provide a user interface to enable IT personnel to control the operation of the device 104 and receive maintenance and other information from the device 104.

In general, a computing device 104 may comprise any hardware and/or code (e.g., a processor 106) that perform some computing function. For example, a device 104 may comprise a computing system such as, without limitation, a personal computer (e.g., a laptop or desktop computer), a phone (e.g., a cellular phone), a personal data assistant, a personal entertainment device, etc.

The management console 102 and the computing device 104 communicate with each other via a communication channel 108. In some embodiments the communication channel utilizes a wired or wireless data network. To this end, the management console 102 and the device 104 may include network interface components 110 and 112, respectively.

The management console 102 is configured to send system management requests and messages to and receive responses and messages from the device 104. For example, the management console 102 may request the device 104 to power-up, power-down and perform local maintenance. The device 104 may include a client management component 114 that initiates and/or performs various diagnostic functions. The diagnostic functions may, either automatically or upon request, generate indications as to the operational status of the device 104. For example, a sensor in the device may detect an event such as partial loss of power. In response, the client management component 114 may send a corresponding message to the management console 102.

Provisions are made in the system to protect against a situation where an unauthorized entity with access to the network attempts to control the device or attempts to send erroneous messages to the management console 102. For example, the management console 102 and the device 104 may include authentication components 116 and 118 that enable each entity in the system (e.g., the console and the device) to verify that any received requests, response or message are from the other entity.

Figure 2:
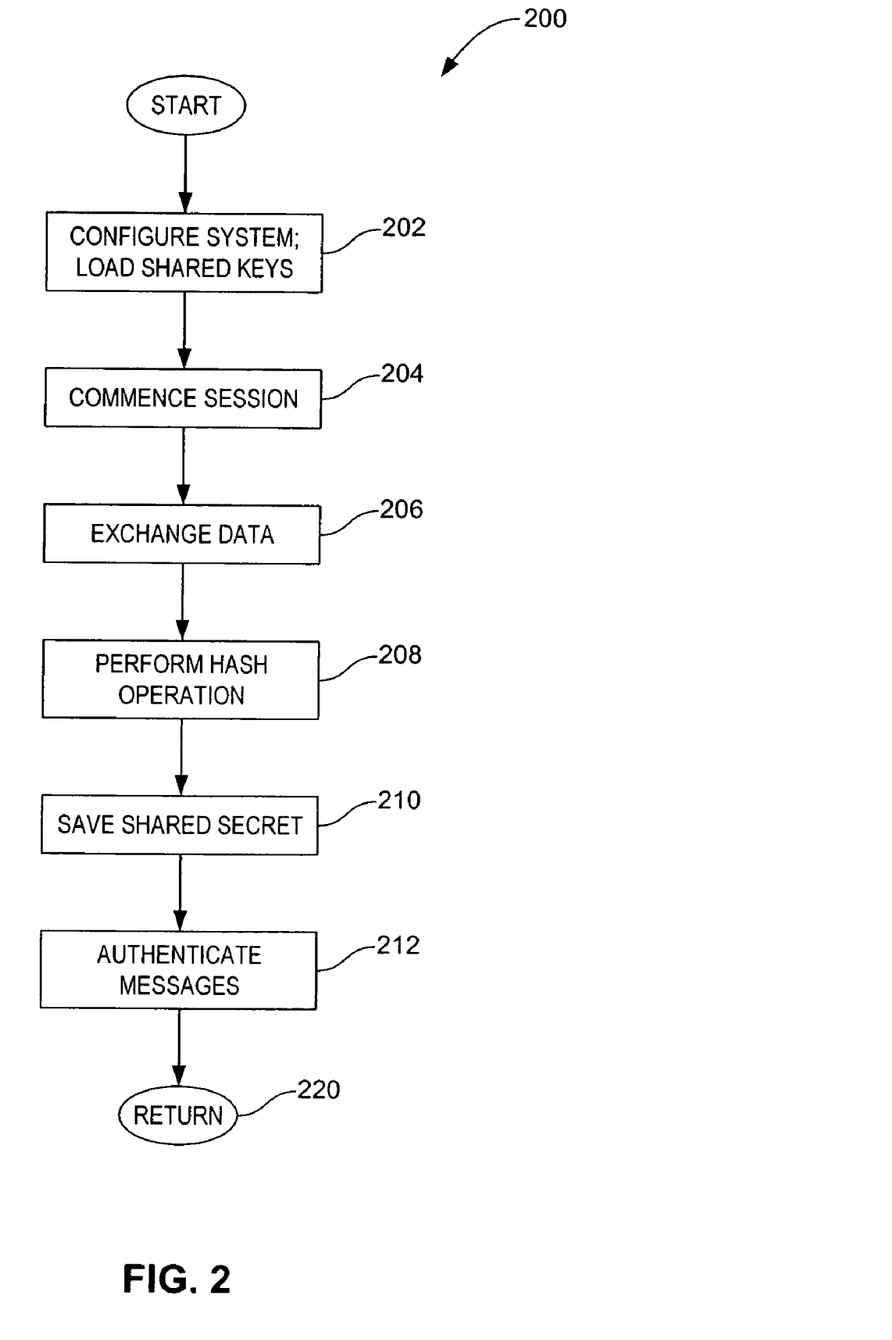
FIG. 2 is a flow chart of one embodiment of operations that may be performed in accordance with the invention.

Referring to FIG. 2, a typical authentication operation involves using one or more shared keys in a hashing algorithm to generate a shared secret between the entities.

For example, as represented by block 202 during configuration of the system shared keys may be loaded into the management console and the device. Then, when the entities commence establishing a communication session (block 204), the entities exchange information such as random numbers (block 206) and use the shared keys to perform a hash operation on the received information and, typically, other information (block 208).

In this way the entities may generate a unique shared secret (block 210) that may be used (e.g., as a cryptographic key) to authenticate each message received from the other entity (block 212).

Referring again to FIG. 1, the device 104 may include a secure processing component 120 that protects any sensitive data and/or processes in the device 104. For example, the secure processing component 120 may protect the secret keys used in or generated by the authentication process (or other cryptographic process). In addition, the secure processing component 120 may secure the authentication process or other cryptographic process performed in the device 104.

Protection of this data and these operations may be desired, for example, in systems where the secret keys used in the authentication process may be shared among multiple devices 104 in the system. Here, in the event an unauthorized entity obtains the shared key value, the unauthorized entity may be able to authenticate itself to other entities in the system and thereby control or otherwise send what appear to be valid messages to those other entities.

In some embodiments the secure processing component 120 is a secure processor.

A secure processor may include one or more cryptographic processors to perform various cryptographic operations including, for example, one or more of encryption, decryption, authentication, signing and verification.

A secure processor also may incorporate physical means of protection. For example, all of the functionality of the secure processor may be implemented within a single integrated circuit. In addition, the secure processor hardware may be protected using tamperproof and/or tamper evident techniques such as epoxy encapsulation.

A secure processor also may use cryptographic techniques to protect information that it stores outside of the secure processor. Here, the secure processor may include at least one cryptographic processor that may be used, for example, to encrypt cryptographic keys or other sensitive data before the secure processor stores the data in a data memory located outside of the secure processor. Moreover, the secure processor may not expose the keys used for or associated with this encryption outside the boundary of the secure processor. For example, the secure processor may never allow certain root or encryption/decryption keys to leave the secure processor boundary.

Figure 3:
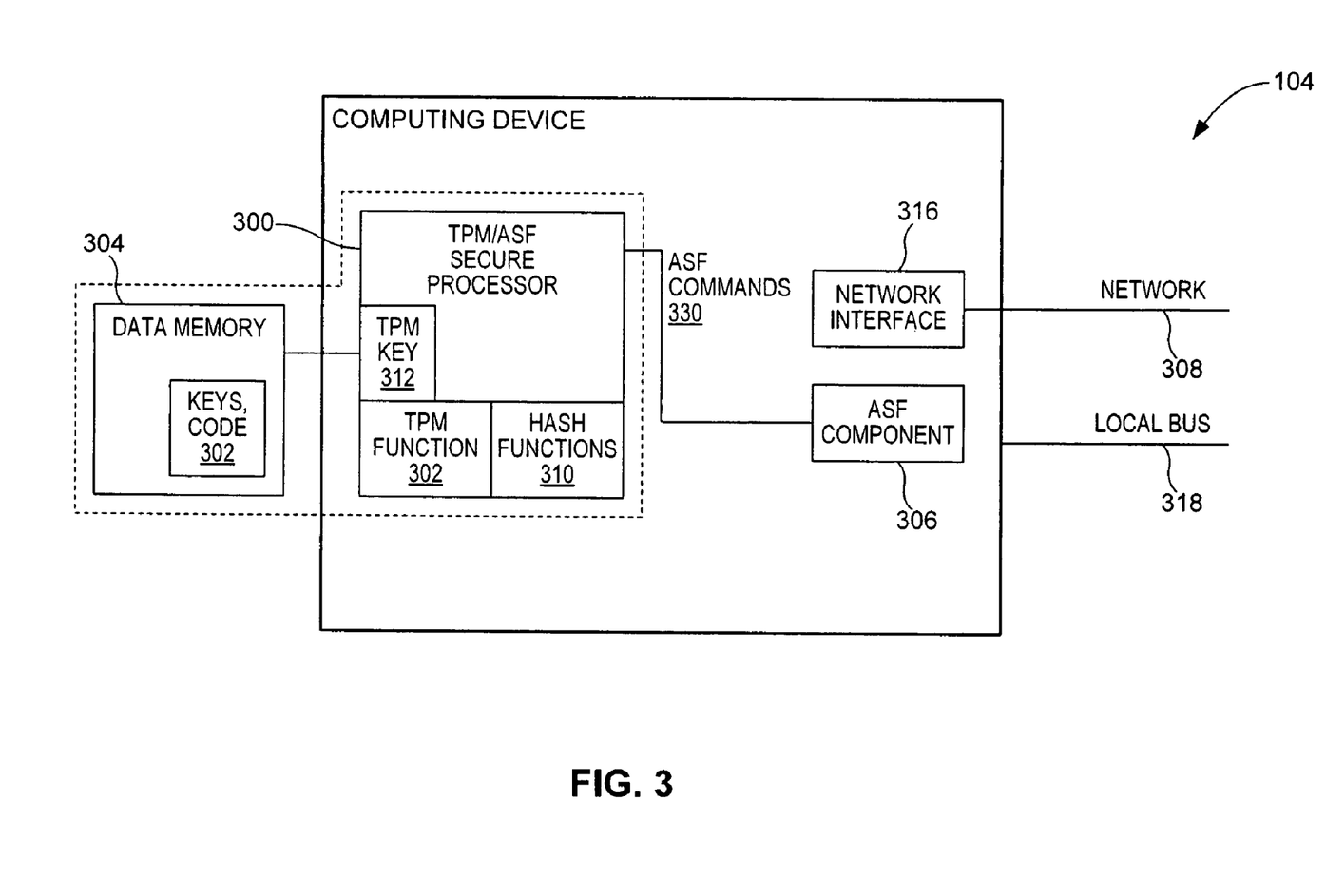
FIG. 3 is a simplified block diagram of one embodiment of an ASF client implemented in accordance with the invention.

Referring to FIG. 3, one embodiment of a computing device 104 that supports the Alert Standard Format (ASF) standard will be described in some detail. The device 104 includes a secure processor 300, a network interface 316 and a component 306 for managing and/or performing system management operations for the device 104. The secure processor 300 also may store data, executable code or other information in encrypted form 302 in a data memory 304.

Here, the client management component 306 is configured to be compliant with the ASF standard. Accordingly, the component 306 may handle requests (e.g., via network 308) from a management console (not shown in FIG. 3) to power-up or power-down the device 104, process alerts generated locally or received via a local bus 318, format and send appropriate responses and messages to the management console (e.g., via network 308) and perform other system management functions.

In some embodiments the secure processor 300 is a trusted platform module ("TPM") constructed and operating in accordance with the specifications of the Trusted Computing Group ("TCG"). In general, a TPM provides a mechanism to securely generate and maintain keys used by an associated system. The TPM may be configured such that the TPM only uses keys when the TPM has verified that the keys are protected and the system is not corrupted. For example, the TPM may use a secure boot process and may only execute authenticated code. In addition, a TPM may incorporate physical and/or cryptographic protection techniques as discussed herein.

Conventional TPM functions 320 involve generating and maintaining keys for one or more users. For example, a user authorized to use the device within which the TPM is implemented may request the TPM to generate a key. Here, the TPM may require the user to create a password associated with the key. The TPM will thus only enable use of the key upon verification of the password. For example, when a user wishes to encrypt data using the key, the user may send the data to an encryption application and send the password to the TPM. In response, the TPM may retrieve the appropriate key from external memory, use an internal cryptographic processor to decrypt the key then release the key to the encryption application. Similarly, when a user uses the TPM to sign data with the key, the user may send the data and the password to the TPM. In response, the TPM may retrieve the appropriate key from external memory and use an internal cryptographic processor to decrypt the key. Next, the TPM uses the key in an internal cryptographic processor to sign the data. The TPM then sends the signed data to the user (e.g., to the user's application). One advantage of the above approach is that in the event the device is stolen, the thief may not be able to access the keys protected by the TPM.

Consequently, the thief may not be able to access any information protected by those keys.

The TPM also may be used to provide cryptographic services for ASF operations.

For example, a TPM 300 may be used during an ASF authentication (e.g., HMAC) process. In some embodiments the TPM maintains keys for the authentication process within the TPM's security boundary (represented by the dashed line in FIG. 3). For example, the TPM may use one of the keys it generates (e.g., key 312) to encrypt the keys. The TPM may then securely store these encrypted keys in the data memory 304.

The device may thus only expose keys in the clear when the device needs to perform an ASF authentication operation. As discussed above, when the device and the management console initiate a new session (e.g., via a network 308), the device needs to perform a calculation for a new key. In this case, the TPM retrieves the encrypted key from the data memory, decrypts it and passes the clear text key to the ASF component.

Thus, in contrast with conventional techniques, the keys used in the authentication operation may not be stored in the clear in the system.

One advantage of such embodiments may be that even if the device including the TPM falls into the wrong hands, an unauthorized person may not be able to decrypt the keys stored in data memory. Consequently, the unauthorized person can not use those keys to establish an authenticated session with the other entities (e.g., computers) in the computing system.

However, the key could still be compromised by malicious code (e.g., a virus, spyware, Trojan horse code, etc.) that was surreptitiously installed on the device. Such code may gain access to data routed within the device (e.g., by monitoring the software stack, temporary data storage, etc.). For example, the TPM may pass the key as a parameter to the ASF component in a function call. The parameters in that function call may be stored in unprotected system memory at some point during the process. As a result, the code may be able to send the key to an unauthorized person (e.g., via a connection over the network 308).

Sensitive algorithms or algorithms that use or generate sensitive data may be executed within the security boundary of the secure processor. Thus, as shown in FIG. 3 the TPM may execute the hash functions 310 for the ASF authentication operation.

Here, a command 330 received from the ASF component 306 may cause the TPM secure processor 300 to receive the necessary key(s) and provide a hash output to the ASF component 306. This process may involve, for example, loading encrypted keys 302 (encrypted with, e.g., a TPM key 312) into the TPM 300, decrypting the keys and using them to perform the HMAC calculation. Here, provisions may be made to ensure that the ASF component 306 made the request.

One advantage of this approach may be that even if malicious code is installed on the device, the code will not have access to the key since the key is only presented in the clear within the TPM 300. Accordingly, an unauthorized person may be prevented from accessing the shared keys to establish an authenticated session with the other entities in the computing system.

In some embodiments different commands may be used to access the different secure functionality supported by the secure processor. For example, TPM commands 340 may be used to invoke TPM functions 320 and ASF-specific commands 330 and/or TPM commands 340 may be submitted to the TPM 300 to invoke the desired HMAC processing 310. In some embodiments the commands may be provided to the secure processor 300 via the same bus (not shown). However, the different commands may result in different, e.g., totally separate and isolated, processing within the secure processor 300.

In some embodiments separate interfaces may be provided for the ASF-specific commands 330 and TPM-specific commands 340. For example, through the use of a dedicated command interface between the ASF component 306 and the TPM 300, the TPM 300 may be assured that the ASF commands 330 received via this interface originate only from the ASF component 306. This approach thus provides a form of automatic-authentication for the TPM 300. As a result, the TPM 300 may not require that an authentication credential be presented to use the ASF keys and/or ASF functions.

The separate interfaces may be separate physical interfaces or separate logical interfaces. For example, separate logical interface may be established by using a unique authentication value (only known by the ASF component 306 and the TPM 300) in conjunction with the ASF commands 330.

In some embodiments the TPM 300 is configured so that the TPM applications and the non-TPM applications operate independently of one another even though these applications share the processing capability of the TPM 300. Here, the TPM 300 may be configured so that the operation of the ASF applications may not materially affect the operation of the TPM applications. Due, in part, to the method of implementing non-TPM operations as taught herein, non-TPM operations may be implemented such that they do not operate on or affect the data used by the TPM operations. For example, non-TPM operations may not cause the data and operations of the TPM to be exposed outside of the TPM 300. Thus, the commands associated with the ASF application may be implemented such that they do not violate or compromise the security of the TPM 300.

In this way, the TPM path may be certified as TPM compliant even though the TPM 300 supports other non-TPM functionality. In addition, non-TPM operations may be implemented such that the TPM 300, and only the TPM, controls the key space used within the TPM 300, including keys used for non-TPM operations.

Figure 4:
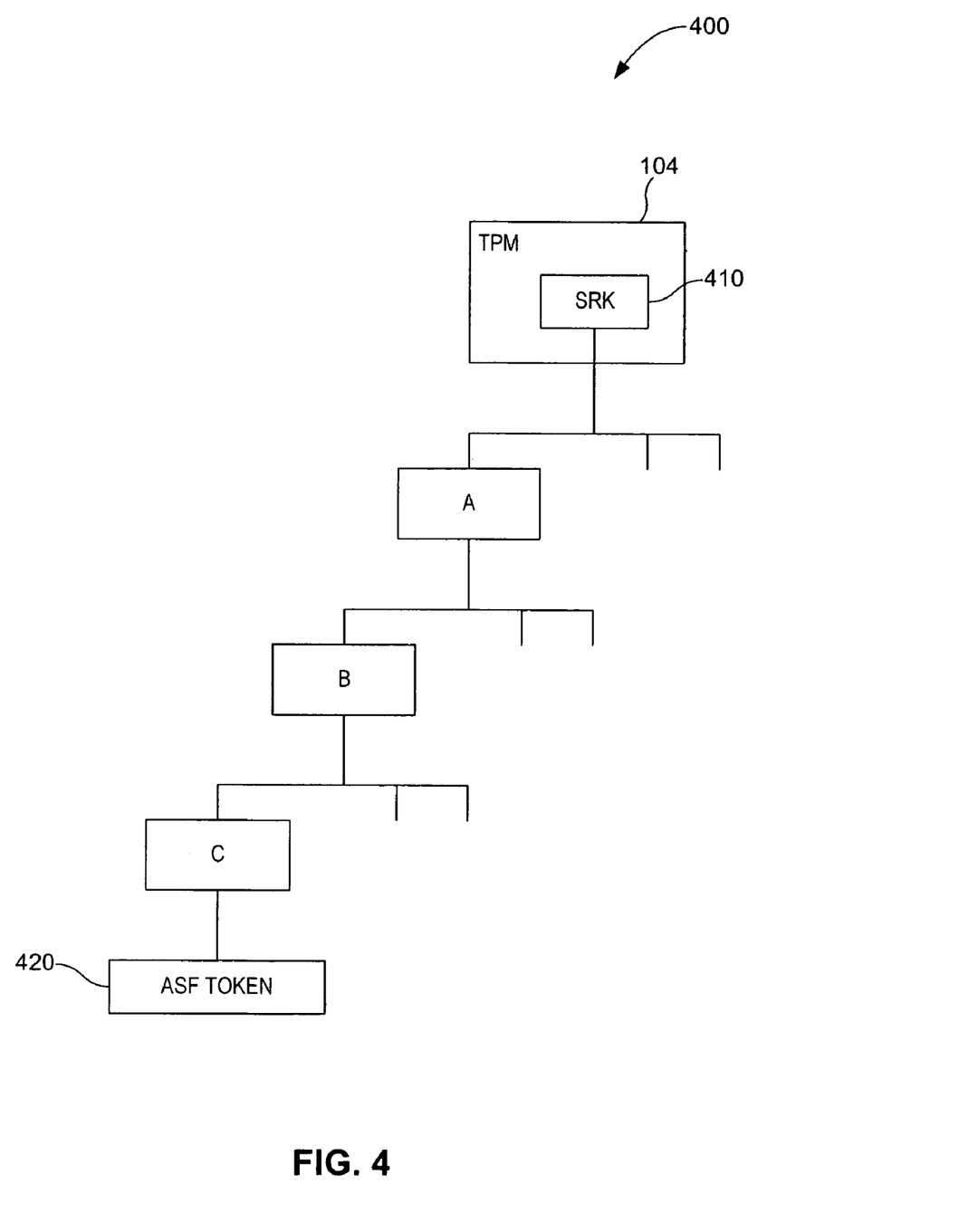
FIG. 4 is a simplified diagram of one embodiment of a key hierarchy in accordance with the invention.

Referring now to FIG. 4, additional details of how a TPM may be configured such that the resources of the TPM are used in a relatively non-comprising manner to generate ASF-related data will be discussed. FIG. 4 depicts one embodiment of a key hierarchy 400 that may be implemented using a TPM. The TPM uses a storage root key 410 (SRK) to encrypt keys, such as key A, at a next lower level (e.g., level 2) in the key hierarchy 400. In an embodiment of the invention, the TPM generates the SRK 410 when a user takes ownership of the TPM. Conventionally, the SRK 410 never leaves the TPM.

Hence, the TPM provides a high level of protection for any keys protected by the SRK 410.

The TPM may then use keys at level 2 of the hierarchy 400 to encrypt keys at a next lower level (e.g., key B at level 3) and so on. In conjunction with these keys, the TPM generates a table that describes any authorization associated with usage of a key.

This hierarchical technique provides, for example, a secure mechanism for providing keys for different applications.

To keep the size of the TPM as small as possible, a structure including the key and any associated data (referred to herein as a "key blob") are stored in external data memory. A key blob typically includes some information that is sensitive and some that is not sensitive. Accordingly, a TPM may only encrypt the sensitive information. A stored key blob may thus contain encrypted data and non-encrypted data.

When a user or application needs to use a key, the TPM may initially need to load in and decrypt all of the keys in the corresponding hierarchy. For example, to use key C, the TPM may first load in the appropriate key from level 2 (e.g., key A), decrypt key A using the SRK 410, then load in the appropriate level 3 key (e.g., key B), decrypt that key using key A, then load in the target key (key C in level 4) to decrypt key C using key B.

In practice, the TPM may implement measures to more efficiently gain access to the target key once the key has been accessed. Here, the user has proven that he has access to a given key. Accordingly, the TPM may store the key blob in a different format, a context blob. The TPM encrypts the context (e.g., using the key from the next higher level) except for context identification information. Software external to the TPM may then manage the resource by saving off the context and reloading it as necessary. As a result it is not necessary to load all of the keys in the upper layers of the hierarchy 400 to use a key blob. Rather, the next time the user requests to use the target key, the TPM may invoke a relatively simple swapping technique to load in and decrypt the corresponding key blob context.

From the above, it should be appreciated that in embodiments where the TPM simply stores the ASF key for the ASF component, the TPM may manage the ASF shared key in the same manner as any other key. For example, upon presentation of an appropriate credential (e.g., a common or a dedicated ASF interface), the TPM retrieves the encrypted ASF key, uses one of its keys to decrypt the ASF key and provides the key to an application associated with the requester (e.g., authorized user) of the key.

As discussed above, the TPM may be configured to use conventional TPM functionality to manage keys for ASF functions. Some ASF functions (e.g., hash functions) may use algorithm-specific parameters such as a key, a seed, etc. Accordingly, one or more structures (referred to herein as an ASF token or ASF blob 420) including these parameters may be defined for ASF functions.

In embodiments where the TPM performs ASF operations such as the hash function 310, the TPM may be configured to manage an ASF blob 420 whereby a parent key of the ASF blob 420 is used for loading and operating upon the ASF blob 420. Here, the parent key (e.g., key C in FIG. 3) of an ASF blob 420 has attributes that are similar to the attributes of a key blob in normal TPM operations. In this way, the TPM may treat the parent key of an ASF blob 420 in the same way, hierarchically, as it treats a key blob (in TPM operations). This approach enables certain ASF operations such as the hash function 310 to be efficiently and securely implemented within the TPM structure.

For example, the TPM may manage loading and evicting of the parent key in the same way as any other key. Thus, the TPM may use its normal operations and resources to load and evict a key regardless of whether the key relates to a typical TPM-related operation or an ASF operation. This may thus avoid, for example, the need for using dedicated TPM internal memory for storage of ASF-specific keys or the need for custom commands or operations to load and evict ASF-specific keys. Moreover, an ASF parent key may be efficiently loaded (after the first load) using the standard TPM swapping technique discussed above.

In addition, the TPM may use similar user authentication operations for the parent key and TPM keys. For example, a TPM typically incorporates a mechanism to associate user authentication (e.g., a password) with a given key. In conjunction with this mechanism, provisions may be made to enable certain users or applications to access a given key and to enable the associated authentication parameter (e.g., password) to be changed. Through the use of similar key structures for TPM and ASF operations, such authentication capabilities may be provided for ASF operations without the need for ASF-specific resources (e.g., custom commands, key resources, etc.). These capabilities may thus be used to indirectly (via the ASF parent key) provide authorization control for an ASF token.

The above ASF-related operations may be performed using standard TPM commands. For example, a change authorization command may be invoked to set user authorization parameters. A create key command may be invoked to generate an ASF parent key. A load key command may be used to load an ASF parent key into the TPM.

By using at least some of the same commands for TPM and ASF operations, system resources (e.g., code space) may be saved since may not be necessary to replicate those functions for the ASF operations or alter the TPM code to handle a large number of ASF-specific commands. In addition, the processor executing the operations does need to interpret whether a given command is a TPM command or an ASF command. Moreover, the processor may not need to be configured to enforce different rules associated with different types of commands.

Also, the keys may be managed using the same trusted software stack (TSS) normally used by the TPM. Accordingly, ASF operations may be added to a TPM without requiring the TSS to identify all commands as either TPM-specific or ASF-specific.

Figure 5:
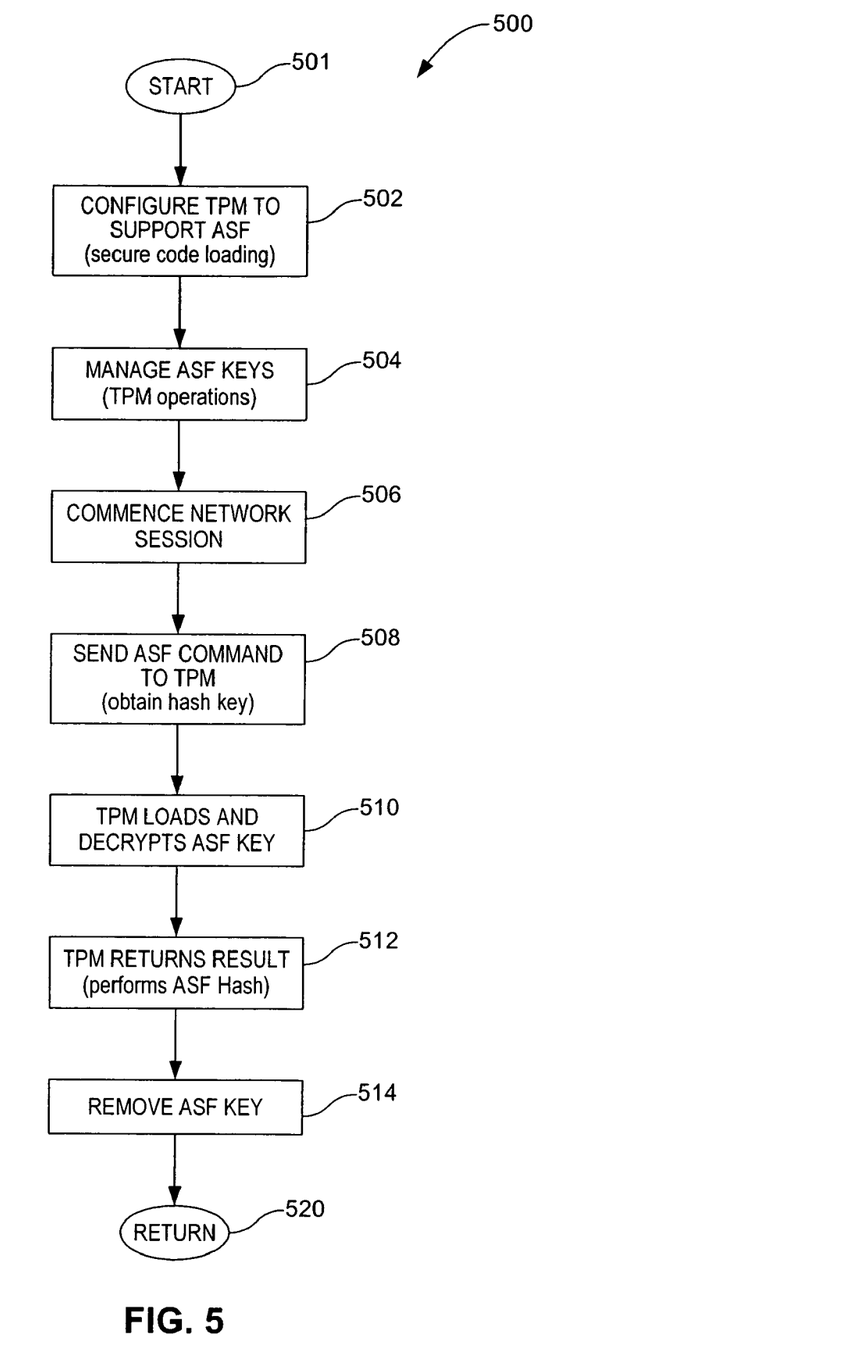
FIG. 5 is a flow chart of one embodiment of operations that may be performed in accordance with the invention.

An example of ASF processing operations performed by the TPM will be discussed in conjunction with the flowchart of FIG. 5. The process begins at step 501. as represented by block 502, the TPM may initially be configured to support ASF functionality. For example, code for one or more ASF-specific commands may be loaded into the TPM and the functions necessary to perform one or more ASF algorithms may be loaded into the TPM. The ASF-related code and other related parameters may be loaded into the TPM using a secure code loading technique as described, for example, in U.S. patent application Ser. No. 11/250,265, filed Oct. 13, 2005, the disclosure of which is incorporated by reference herein.

As represented by block 504, the ASF-related keys (e.g., shared keys) may be managed by the TPM using conventional TPM operations. For example, in embodiments that only use the TPM to store the ASF key, the TPM may manage the ASF key like any other TPM key. In embodiments where the TPM also performs the ASF hash functions, the ASF key and associated parameters may be treated as a token that the TPM indirectly manages via a parent key. In this case, the TPM may manage the ASF parent key like any other TPM key. Accordingly, the TPM may in the usual manner create these keys, set authorization for these keys, create a key context, etc.

As represented by block 506, when a network session is commenced between an ASF server (e.g., a management console) and an ASF client (e.g., the component 306), the ASF client initiates the appropriate operations to generate the shared secret for the session. In some embodiments this involves sending a command to the TPM to obtain the key used for the hash algorithm (block 508).

As represented by block 510, the TPM loads and decrypts the appropriate key (e.g., the ASF key or the ASF parent key) into the TPM. As discussed above, for ASF commands received via a dedicated interface the TPM may not require an authorization credential to use the key.

The TPM either passes the clear text key back to the ASF component or uses the key to invoke the hash operation within the TPM and passes the calculated shared secret to the ASF component (block 512). In the latter case, because the TPM treats the ASF parent key like any other key, the TSS may simply evict one of the keys in the TPM, if necessary, and load the ASF parent key and manage the resources essentially like any other key. Here, however, instead of handing the result of a decryption operation up to the application as in a typical TPM key management operation, the TPM also performs the ASF hash calculation and hands up the result of the calculation. That is, after the TPM loads and decrypts the parent key, the parent key is used to load in the ASF blob, decrypt it and perform the hash operation.

The hash algorithm code may be stored in an internal TPM code memory or in an external flash memory. In the latter case, the TPM may store the code in encrypted form using, for example, the secure code load mechanism discussed above. Briefly, the TPM uses a mechanism to determine the location of the code in external flash and uses a protected key to encrypt/decrypt and/or authenticate the code stored in flash.

As represented by block 514, the TPM may then "discard" the keys or, in the event the key has changed, re-encrypt the key and save it back out to the data memory.

The process concludes with step 520.

Figure 6:
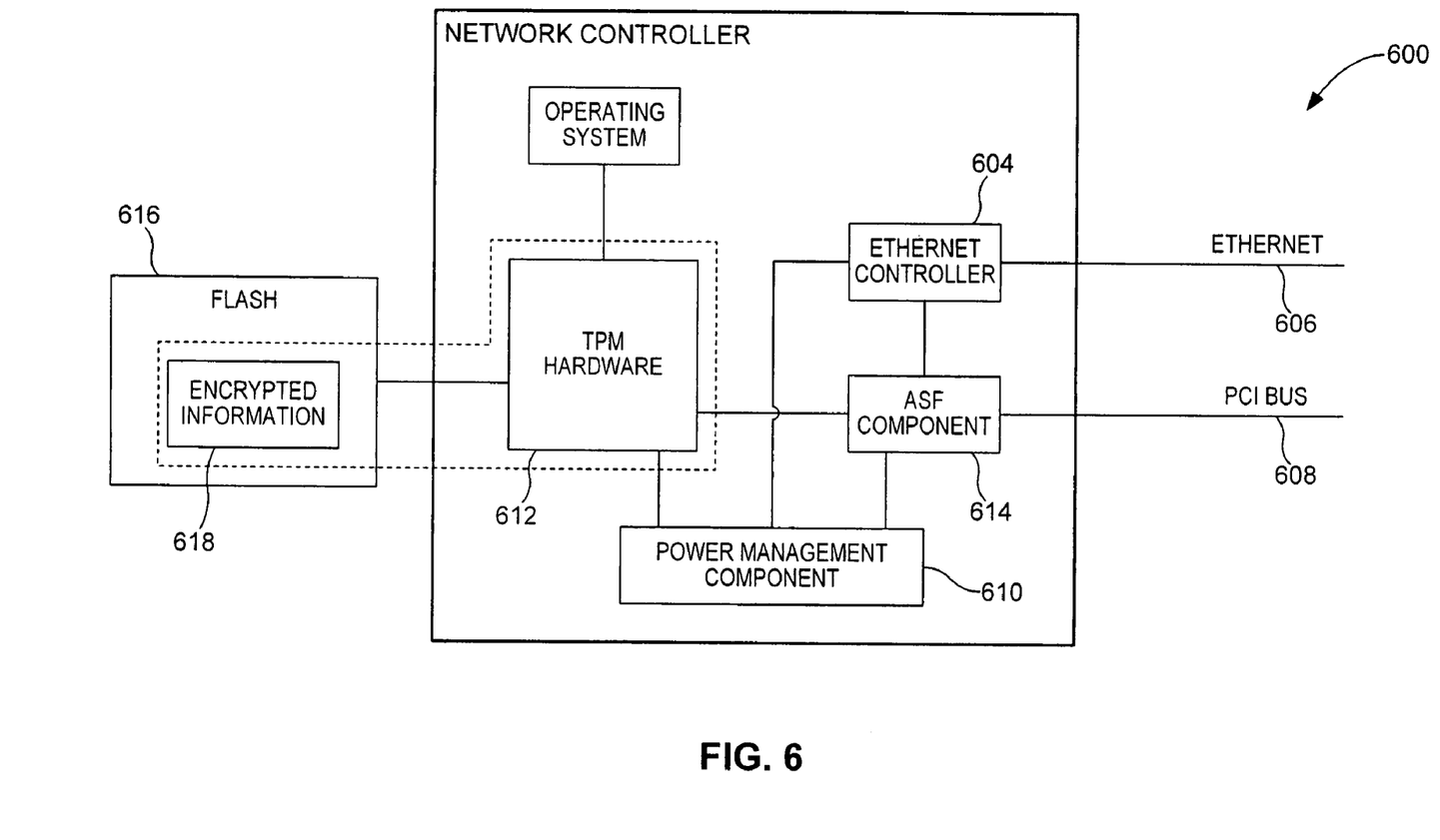
FIG. 6 is a simplified block diagram of one embodiment of a network interface implemented in accordance with the invention.

Referring to FIG. 6, in some embodiments, the TPM secure processor is implemented within the same chip as a network controller 600. For example, the network controller may be a Gigabit Ethernet controller that supports ASF. The network controller may include an Ethernet controller 604 for interfacing with an Ethernet network 606 and a bus interface (not shown) for interfacing to a local bus such as a PCI-based bus 608.

The network controller also may include a power management component (e.g., power control circuitry) 610 that may control power consumption or other operating parameters in the controller. The power management component 610 may take various steps to reduce the power consumption of a component or a portion of a component including, for example, one or more of turning off or reducing power, disabling a clock signal, changing (e.g., reducing) the frequency of a clock signal, configuring a component to turn itself off, enter a sleep state, reduce its operating frequency, etc. To this end, the power management component 610 may incorporate switches or other mechanisms to control power, clock signals, other signals, etc., routed over one or more power or signal paths (e.g., dedicated paths to the components or subcomponents).

The power management component 610 may provide auxiliary power to the ASF component 614, the secure processor (e.g., TPM) 612 and, when any required keys 618 are stored external to the TPM, such as a local memory (e.g., flash 616) even when the device is in an OS-absent state, a powered-down state, a reduced-power (e.g., sleep) state, etc. Hence, the ASF component 614 may access the TPM 612 to obtain the necessary authentication key material and/or have authentication operations executed when the device is in such a state. In some embodiments the TPM (and local memory if required) is always powered when any system power (e.g., auxiliary power) is available.

Alternatively, the power management component 610 may provide power to the TPM 612 (and local memory if required) only when TPM operations need to be performed. For example, when a component (e.g., the ASF component 614) determines that it needs to perform a secure operation (e.g., a cryptographic operation such as the ASF hash), the component may send an appropriate signal to the power management component 610. In response, the power management component 610 may power up the appropriate portion of the device (e.g., the TPM 612), restart (or change the speed of) a clock to the component, reconfigure the component to become active (e.g., by sending a "wake-up" signal) or perform some other function that activates the component.

In some embodiments, the power management component 610 power may only power selected registers in a component during an OS-absent state, a powered-down state, a reduced-power state, etc. In this way, critical information (e.g., the current state of the component) may not be lost when the power management component 610 takes steps to reduce the power consumption of the device.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention hardware components such as controllers, state machines and/or logic are used in a system constructed in accordance with the invention. In some embodiments code such as software or firmware executing on one or more processing devices may be used to implement one or more of the described operations.

The components and functions described herein may be connected and/or coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a conductor, light pulses transmitted through an optical medium such as an optical fiber or air, or RF waves transmitted through a medium such as air, etc. A signal may comprise more than one signal. For example, a signal may consist of a series of signals. Also, a differential signal comprises two complementary signals or some other combination of signals. In addition, a group of signals may be collectively referred to herein as a signal. Signals as discussed herein also may take the form of data. For example, in some embodiments an application program may send a signal to another application program. Such a signal may be stored in a data memory.

A wide variety of devices may be used to implement the data memories discussed herein. For example, a data memory may comprise RAM, ROM, flash memory, one-time-programmable memory or other types of data storage devices.

The invention described herein generally relates to an improved system and method for supporting ASF. While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A computing device, comprising:
   a network interface configured to communicate with an external communication path;
   a secure processor configured to operate in accordance with a Trusted Platform Module (TPM) standard; and
   a client management component configured to operate in accordance with an Alert Standard Format (ASF),
   wherein said secure processor is configured to perform client management functions associated with said client management component to authenticate communications, passed via said network interface, between the computing device and a management console,
   wherein parameters for said client management functions are stored in an ASF blob data structure,
   wherein said secure processor is configured to manage an ASF blob parent key that is used to encrypt at least a portion of said ASF blob data structure in a manner compatible with said TPM standard.

2. The computing device of claim 1, wherein communications from said management console comprise a request to the computing device to perform an action.

3. The computing device of claim 1, wherein said client management component comprises means to send a status message, via said network interface, to said management console.

4. The computing device of claim 1, wherein said secure processor operates within a security boundary.

5. The computing device of 1 wherein said client management functions comprise a hashing function.

6. The computing device of 1 wherein said client management functions comprise one or more of: generating a key; encrypting said key; decrypting said key; and maintaining said key in a key hierarchy.

7. The computing device of claim 1, wherein said secure processor comprises means for managing said ASF blob parent key and means for managing keys unrelated to said ASF blob data structure.

8. The computing device of claim 1, comprising a network controller that comprises:
   said network interface;
   said secure processor; and
   said client management component.

9. The computer device of claim 8, wherein said network controller comprises a power management component comprising means for providing auxiliary power to said secure processor and said client management component in an operating system (OS)-absent state.

10. A method of generating a shared secret in a computing device, the method comprising the steps of:
    a) creating and encrypting a key in a secure processor configured to operate in accordance with a Trusted Platform Module (TPM) standard;
    b) commencing a network session;
    c) issuing a command from a client management component, configured to operate in accordance with an Alert Standard Format (ASF), to the secure processor to obtain the shared secret;
    d) at the secure processor, loading and decrypting the encrypted key, and using the decrypted key to decrypt an ASF blob data structure that stores parameters for client management functions;
    e) using one or more parameters stored in the ASF blob data structure to perform a hash operation to generate the shared secret; and
    f) returning the shared secret from the secure processor to the client management component.

11. The method of claim 10, wherein said step a) further comprises creating a context for the key.

12. The method of claim 11, wherein said creating of the key and said creating of said key context are performed using TPM compatible commands.

13. The method of claim 10, wherein said network session is commenced between the client management component and a management console.

14. The method of claim 10, wherein the key is an ASF key.

15. The method of claim 10, further comprising the step of:
    g) configuring the secure processor to support operations of the client management component, performed before step a).

16. The method of claim 15, wherein said step g) comprises at least one of:
    i) loading code into the secure processor for executing ASF commands; and
    ii) loading code into the secure processor for executing ASF algorithms.

17. The method of claim 16, wherein at least one of said steps i) and ii) is performed securely.

18. The method of claim 10, further comprising the step of:
    g) removing the key, performed after said step e).

19. The method of claim 18, wherein said step g) comprises at least one of:
    i) discarding the key; or
    ii) re-encrypting the key and saving the re-encrypted key.

20. The computing device of claim 1, wherein said parameters include at least a hash key and a seed.

* * * * *